United States Patent
Pascoguin et al.

(10) Patent No.: US 11,632,179 B1
(45) Date of Patent: Apr. 18, 2023

(54) REMOTELY EMITTING CONFINED ELECTROMAGNETIC RADIATION FROM LASER-INDUCED PLASMA FILAMENTS

(71) Applicant: The United States of America, as represented by the Secretary of the Navy, San Diego, CA (US)

(72) Inventors: Bienvenido Melvin L. Pascoguin, San Diego, CA (US); Brittany E. Lynn, San Diego, CA (US); Ryan P. Lu, San Diego, CA (US); Ayax Ramirez, Chula Vista, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/695,433

(22) Filed: Mar. 15, 2022

(51) Int. Cl.
  *H04B 10/50* (2013.01)
  *H04B 10/112* (2013.01)
  *H04B 10/508* (2013.01)

(52) U.S. Cl.
  CPC ..... *H04B 10/5053* (2013.01); *H04B 10/1121* (2013.01); *H04B 10/508* (2013.01)

(58) Field of Classification Search
  CPC ............ H04B 10/5053; H04B 10/1121; H04B 10/508
  See application file for complete search history.

(56) References Cited

U.S. PATENT DOCUMENTS

| | | | | |
|---|---|---|---|---|
| 6,086,204 A | * | 7/2000 | Magnante | A61B 3/1015 |
| | | | | 219/121.75 |
| 2018/0133837 A1 | * | 5/2018 | Greenberg | G02B 27/0955 |
| 2022/0264736 A1 | * | 8/2022 | Quarles | H05H 1/46 |
| 2022/0287171 A1 | * | 9/2022 | Consoli | H05H 15/00 |

OTHER PUBLICATIONS

Couairon, A. "Filamentation length of powerful laser pulses." Applied Physics B 76.7 (2003): 789-792.
Couairon, A., et al. "Femtosecond filamentation in transparent media." Physics reports 441.2-4 (2007): 47-189.
Proulx, A., et al. "Fast pulsed electric field created from the self-generated filament of a femtosecond Ti: Sapphire laser pulse in air." Optics Communications 174.1-4 (2000): 305-309.
Tzortzakis, S., et al. "Coherent subterahertz radiation from femtosecond infrared filaments in air." Optics Letters 27.21 (2002): 1944-1946.

* cited by examiner

*Primary Examiner* — Mina M Shalaby
(74) *Attorney, Agent, or Firm* — Naval Information Warfare Center, Pacific; Kyle Eppele; James McGee

(57) ABSTRACT

A system and method generates confined electromagnetic radiation emanating from a remote position along a line of sight. The system includes a laser arrangement and a wavefront modifier. The laser arrangement generates at least one laser beam. The wavefront modifier produces a spatial arrangement of foci of the laser beam directed along the line of sight. The foci of the laser beam induce plasma filaments within an atmosphere at the remote position along the line of sight. The plasma filaments emit the electromagnetic radiation emanating from the remote position along the line of sight.

20 Claims, 4 Drawing Sheets

REMOTELY EMITTING CONFINED ELECTROMAGNETIC RADIATION FROM LASER-INDUCED PLASMA FILAMENTS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 106313.

BACKGROUND OF THE INVENTION

There is a general need for communications techniques providing particular advantages. For example, directional electromagnetic communication, such as a laser beam or a directional radiofrequency signal through free space, has advantages of increased communication privacy over broadcast radiofrequency signals without needing extra infrastructure, such as a fiber optic cable. However, such directional electromagnetic communication generally requires a clear line of sight between transmitter and receiver, and thus cannot avoid obstacles, such as buildings or terrain, between transmitter and receiver. Although broadcast radiofrequency signals of certain frequencies can pass through small buildings, reflect from buildings and other structures, or reflect from some atmospheric layers, and thus avoid such obstacles, broadcast radiofrequency signals do not generally provide communication privacy.

SUMMARY

A system generates confined electromagnetic radiation emanating from a remote position along a line of sight. The system includes a laser arrangement and a wavefront modifier. The laser arrangement generates at least one laser beam. The wavefront modifier produces a spatial arrangement of foci of the laser beam directed along the line of sight. The foci induce plasma filaments within an atmosphere at the remote position along the line of sight. The plasma filaments emit the electromagnetic radiation emanating from the remote position along the line of sight.

A method generates confined electromagnetic radiation emanating from a remote position along a line of sight. A laser arrangement generates at least one laser beam. A wavefront modifier produces a spatial arrangement of foci of the laser beam directed along the line of sight. The foci of the laser beam induce plasma filaments within an atmosphere at the remote position along the line of sight. The plasma filaments emit the electromagnetic radiation emanating from the remote position along the line of sight.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

High intensity electromagnetic fields, such as powerful laser beams, cause a change in the refractive index of the media through which they arc propagating. The degree of the refractive index change is related quadratically to the magnitude of the field causing the change, known as the Kerr effect. As the index in the high intensity regions increases, the lower intensity regions remain minimally changed resulting in the laser beam creating a lensing effect in the propagation media. As the intensity increases further, a plasma is created, following the path of the laser beam until the intensity of the beam is no longer high enough to continue self-guiding.

Figure 1:
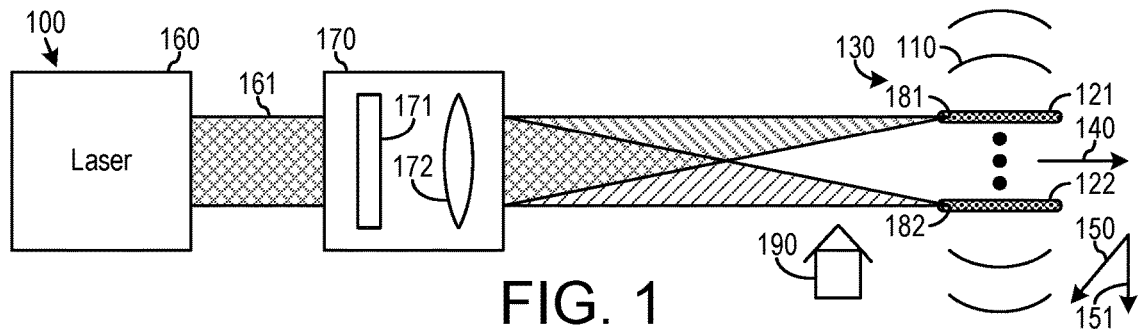
FIG. 1 is a block diagram of a system for generating electromagnetic radiation emanating from a lateral array of plasma filaments at a remote position along a line of sight in accordance with an embodiment of the invention.

FIG. 1 is a block diagram of a system 100 for generating electromagnetic radiation 110 emanating from a lateral array of plasma filaments 121 through 122 at a remote position 130 along a line of sight 140 in accordance with an embodiment of the invention. The electromagnetic radiation 110 is confined, for example, to propagate primarily along a principal direction 150 away from the remote position 130 and out of the page of FIG. 1.

The inventors have discovered that plasma filaments 121 through 122 can be synchronized sufficiently at the remote position 130 so that they emit radiation bursts that are coherent relative to each other. The coherent radiation bursts constructively and destructively interfere, producing an interference pattern. A spatial arrangement of the plasma filaments, such as the lateral array of the plasma filaments 121 through 122 of FIG. 1, is selected to produce a desired interference pattern, such as confining the electromagnetic radiation 110 to have coherent addition in a particular propagation direction and/or confining the electromagnetic radiation 110 to have a narrow bandwidth. This provides advantages similar to direct line-of-sight communication while also avoiding obstacles 190, such as buildings or terrain, that block the direct line of sight.

In this specification and claims, narrow bandwidth is defined as a bandwidth at half maximum of the electromagnetic radiation 110 at an intended receiving position that is a third or less than a bandwidth at half maximum of a broadband electromagnetic radiation emitted from a single plasma filament, such as plasma filament 121.

The system 100 generates the confined electromagnetic radiation 110 emanating from the remote position 130 along a line of sight 140. The system 100 includes a laser arrangement 160 and a wavefront modifier 170. The laser arrangement 160 generates a laser beam 161. The wavefront modifier 170 produces a spatial arrangement of the foci 181 through 182 of the laser beam 161 directed along the line of sight 140. In the embodiment of FIG. 1, the spatial arrangement is a lateral array of the foci 181 through 182. The foci 181 through 182 induce the plasma filaments 121 through 122 within an atmosphere at the remote position 130 along the line of sight 140. The plasma filaments 121 through 122 emit the electromagnetic radiation 110 emanating from the remote position 130 along the line of sight 140.

In one embodiment, the laser arrangement 160 is a single laser generating the laser beam 161 having a planar wavefront, and the wavefront modifier 170 includes a diffraction grating 171 and a lens arrangement 172. From the planar wavefront, the wavefront modifier 170 produces superimposed spherical wavefronts each converging at a respective one of the foci 181 through 182 of the laser beam 161. For example, the diffraction grating 171 is a phase plate with linear rulings of varying phase delay. A phase plate is preferred because reflection and dissipation losses from the typically high-power laser beam 161 are reduced with a phase plate as compared to a diffraction grating with linear rulings of varying opacity. The diffraction grating 171 separates the laser beam 161 into a series of diffraction orders, and the lens arrangement 172 focuses these separated diffraction orders at respective foci 181 through 182.

In another embodiment, the wavefront modifier 170 is a phase plate without a lens arrangement 172. For example, the phase plate of the wavefront modifier 170 is a recorded phase-delay hologram that both separates the incoming laser beam 161 into a series of beams and focusses these separated beams at the foci 181 through 182.

Figure 6A:
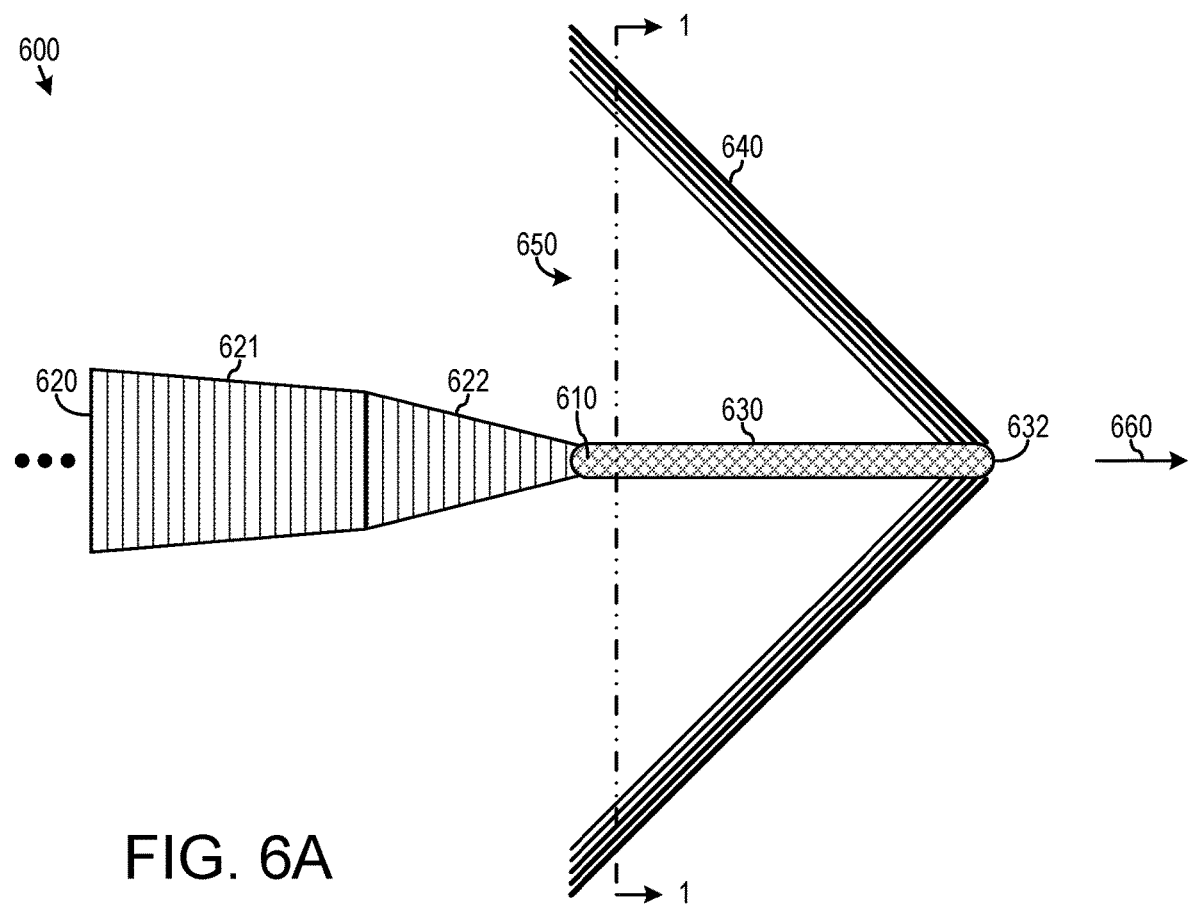
FIGS. 6A and 6B is are cross sections through an atmosphere illustrating a focus of a laser beam inducing a plasma filament that emits electromagnetic radiation emanating from the remote position along the line of sight in accordance with an embodiment of the invention.

Refer to FIG. 6A for an overview of how a focus 610 of a laser beam 620 generates a plasma filament 630. FIG. 6A is a cross section through an atmosphere 600 illustrating a focus 610 of a laser beam 620 inducing a plasma filament 630 that emits electromagnetic radiation 640 emanating from the remote position 650 along the line of sight 660 in accordance with an embodiment of the invention.

The laser beam 620 includes a converging initial portion 621 that converges near the remote position 650 as focused by a wavefront modifier. As the initial portion 621 converges, the intensity of the laser beam 620 increases, until an intensity is attained that initiates self-focusing due to the Kerr effect in the atmosphere 600, such as the Earth's atmosphere. For discussion purposes, FIG. 6A shows the transition from the initial portion 621 to the self-focusing portion 622 as an abrupt transition, but it will be understood the Kerr effect has continuous quadratic progression with intensity. Soon after self-focusing begins, an intensity is reached that initiates formation of the plasma filament 630 at the initiation position of the focus 610. Within the plasma filament 630, a balance is reached between the self-focusing and scattering caused within the excited plasma of the plasma filament 630. At a termination position 632 of the plasma filament 630, the plasma filament 630 dissipates the intensity sufficiently to terminate the self-focusing in the atmosphere 600, and this terminates continuance of the plasma filament 630.

To attain the intensity that initiates self-focusing in portion 622, typically the laser beam 620 compresses the laser energy into short pulses, such as femtosecond pulses. However, the excited plasma of the plasma filament 630 lasts in atmosphere 600 for a time interval of typically nanoseconds. Because the plasma filament 630 has a length typically measured in meters between the initiation position of the focus 610 and the termination position 632, the time interval is typically nanoseconds for a femtosecond pulse of the laser beam 620 to propagate from the initiation position of the focus 610 to the termination position 632. Thus, by the time a femtosecond pulse of the laser beam 620 reaches the termination position 632, the excited plasma of plasma filament 630 already becomes partially or fully dissipated at the initiation position of the focus 610.

The plasma filament 630 emits broadband electromagnetic radiation 640 from its excited plasma. The emitted broadband electromagnetic radiation 640 is a function of the electron density of the plasma filament 630. The electromagnetic radiation 640 propagates away from the plasma filament 630 at the same speed of light that the femtosecond pulse of the laser beam 620 traverses the length of the plasma filament 630. Therefore, the electromagnetic radiation 640 has a wavefront that forms the 45 degree angle from the plasma filament 630 as shown in FIG. 6A. Although this might suggest that the electromagnetic radiation 640 propagates in a direction perpendicular to the 45 degree angle of the wavefront shown in FIG. 6A, the electromagnetic radiation 640 instead primarily propagates in a direction radially away from the plasma filament 630 (vertically in the cross section of FIG. 6A).

Returning to FIG. 1, because the path lengths are equal from the laser arrangement 160 through the wavefront modifier 170 to each of the foci 181 through 182, a pulse of the laser beam 161 simultaneously initiates the plasma filaments 121 through 122 when intensities are balanced to achieve balanced self-focusing across the foci 181 through 182. With balanced intensities across the foci 181 through 182, the plasma filaments 121 through 122 simultaneously terminate at their respective termination positions. Thus, the foci 181 through 182 are concurrently produced across the spatial arrangement's lateral array from a pulse of the laser beam 161. Each of the foci 181 through 182 of the laser beam 161 induces a respective one of the plasma filaments 121 through 122 within the atmosphere 600, such that the plasma filaments 121 through 122 conform to the spatial arrangement of the foci 181 through 182 of the laser beam 161. Thus, the plasma filaments 121 through 122 are concurrently produced across the lateral array shown in FIG. 1.

Each of the plasma filaments 121 through 122 emits a respective portion of the electromagnetic radiation 110 emanating from the remote position 130. Because the foci 181 through 182 are concurrently produced across the spatial arrangement, the plasma filaments 121 through 122 synchronously emit respective portions of the electromagnetic radiation 110 during the filament lifetime of the plasma filaments 121 through 122. The respective portions of the electromagnetic radiation 110 from plasma filaments 121 through 122 have similar wavefront packet shapes to the extent of the balance between the foci 181 through 182. For balanced foci 181 through 182, the plasma filaments 121 through 122 synchronously emits respective portions of the electromagnetic radiation 110 that have the similar wavefront packet shapes. The respective portions of the electromagnetic radiation 110 emitted during the filament lifetime of plasma filaments 121 through 122 are coherent because they are synchronously emitted and have similar wavefront packet shapes.

Typically, the similar wavefront packet shapes typically have a duration given by the diameter and the filament lifetime of the plasma filaments 121 through 122. The duration of the similar wavefront packet shapes roughly gives a period of a longest wavelength within the similar wavefront packet shapes. The similar wavefront packet shapes are typically asymmetrical, with a fast rise time initiated by a femtosecond pulse of the laser beam 161, and a slower fall time given by the thermal decay of the plasma filaments 121 through 122. The steepness of the leading edge of the similar wavefront packet shapes roughly gives a shortest wavelength within the similar wavefront packet shapes. Typically, the femtosecond pulse of the laser beam 161 has a pulse duration at least an order of magnitude shorter than a nanosecond filament lifetime of the plasma filaments. Thus, the shortest and longest wavelengths within the similar wavefront packet shapes typically differ by at least an order of magnitude. This is broadband radiation.

To summarize, the plasma filaments 121 through 122 emit similar wavefront packet shapes of coherent broadband radiation containing wavelengths in a broad bandwidth between a shortest wavelength roughly given by the steepness of the leading edge of the similar wavefront packet shapes and a longest wavelength roughly given by the duration of the similar wavefront packet shapes. The respective portions of the electromagnetic radiation 110 are coherent because the foci 181 through 182 are concurrently produced across the spatial arrangement and because the pulse duration of the laser beam 161 is much shorter than the filament lifetime of the plasma filaments 121 through 122.

Because the respective portions of the electromagnetic radiation 110 are coherently emitted from the plasma filaments 121 through 122, the respective portions of the electromagnetic radiation 110 constructively and destructively interfere depending upon their relative phases given by path lengths from the plasma filaments 121 through 122. The inventors have discovered not only is the electromagnetic radiation 110 emitted coherently from the plasma filaments 121 through 122, but also embodiments of the invention synchronize the plasma filaments 121 through 122 sufficiently so that the coherent electromagnetic radiation 110 has a coherence length that extends into the far field, especially for radiofrequency coherent electromagnetic radiation 110. Thus, the constructive and destructive interfere between the respective portions of the electromagnetic radiation 110 extends into the far field. In particular, for the linear array shown in FIG. 1, the respective portions of the electromagnetic radiation 110 from the plasma filaments 121 through 122 all constructively interfere in a principal direction 150 perpendicular the center of a plane encompassing the plasma filaments 121 through 122.

It will be appreciated that alternatively the spatial arrangement of the foci 181 through 182 is curved in FIG. 1, such that the plasma filaments 121 through 122 are disposed upon a cylinder with a radius shorter than a distance to the far field. Then the respective portions of the electromagnetic radiation 110 from the plasma filaments 121 through 122 all constructively interfere along the central axis.

Figure 2:
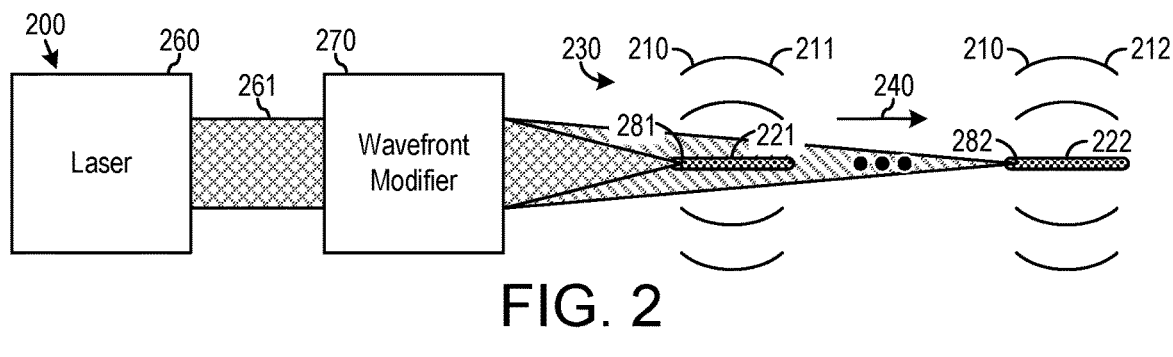
FIG. 2 is a block diagram of a system for generating electromagnetic radiation emanating from a longitudinal array of plasma filaments at a remote position along a line of sight in accordance with an embodiment of the invention.

FIG. 2 is a block diagram of a system 200 for generating electromagnetic radiation 210 emanating from a longitudinal array of the plasma filaments 221 through 222 at a remote position 230 along a line of sight 240 in accordance with an embodiment of the invention. The laser arrangement 260 generates a laser beam 261. The wavefront modifier 270 produces a spatial longitudinal arrangement of foci 281 through 282 from the laser beam 261 directed along the line of sight 240. The foci 281 through 282 induce respective plasma filaments 221 through 222 within an atmosphere at the remote position 230 along the line of sight 240. The plasma filaments 221 through 222 emit the electromagnetic radiation 210 emanating from the remote position 230 along the line of sight 240.

Because the path length is shorter from the laser arrangement 260 through the wavefront modifier 270 to the focus 281 than the path length to focus 282, the plasma filament 221 begins emitting its respective portion 211 of the electromagnetic radiation 210 before the plasma filament 222 begins emitting its respective portion 212 of the electromagnetic radiation 210 for each pulse of laser beam 161. Thus, the portions 211 through 212 of the electromagnetic radiation 210 of FIG. 2 are less synchronized than the portions of the electromagnetic radiation 110 of FIG. 1. This reduced synchronization reduces the coherence length of the coherent portions 211 through 212 of the electromagnetic radiation 210, such that constructive and destructive interference between portions 211 through 212 extends less far towards the far field, and typically only for wavelengths longer than a longitudinal pitch between the plasma filaments 221 through 222.

Figure 3:
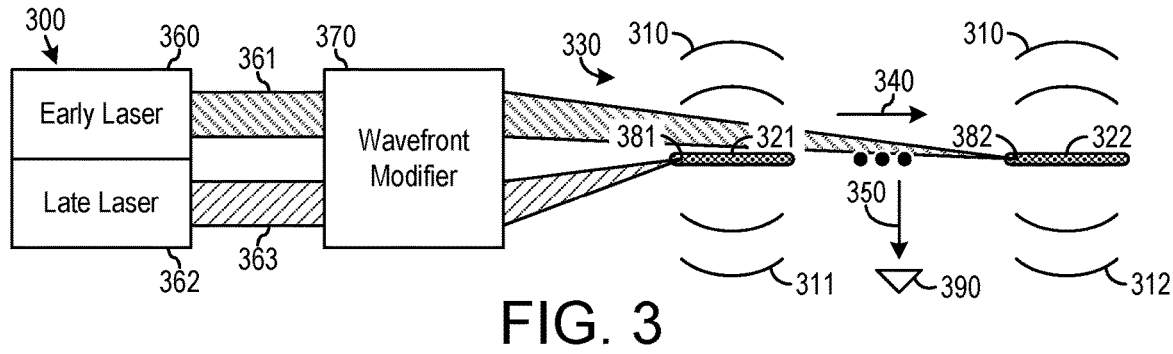
FIG. 3 is a block diagram of a system for generating electromagnetic radiation emanating from a longitudinal array of plasma filaments at a remote position along a line of sight in accordance with an embodiment of the invention.

FIG. 3 is a block diagram of a system 300 for generating electromagnetic radiation 310 emanating from a longitudinal array of plasma filaments 321 through 322 at a remote position 330 along a line of sight 340 in accordance with an embodiment of the invention. The system 300 of FIG. 3 improves synchronization and coherence over the system 200 of FIG. 2.

A laser arrangement includes an early laser 360 generating laser beam 361 and a late laser 362 generating laser beam 363. Wavefront modifier 370 focusses the laser beam 361 at focus 382 and focusses the laser beam 363 at focus 381. The laser arrangement includes additional lasers for any additional foci between foci 381 and 382. The early laser 360 generates a pulse of laser beam 361 before the late laser 362 generates a corresponding pulse of laser beam 363, with a time interval between these pulses of laser beam 361 and 363 matching a difference between a path length from early laser 360 through wavefront modifier 370 to focus 382 and a path length from late laser 362 through wavefront modifier 370 to focus 381.

Thus, the laser arrangement of lasers 360 and 362 and the wavefront modifier 370 are synchronized to control simultaneous initiation of the plasma filaments 321 through 322 at the initiation positions of the foci 381 through 382, and to control simultaneous termination of a respective one of the plasma filaments 321 through 322 for each of the foci 381 through 382 at the termination position along the line of sight 340.

In one example, a master laser generates a laser pulse feed through respective optical fibers to a laser amplifier of early laser 360 and another laser amplifier of late laser 362. The optical fibers have a difference in optical length corresponding to a difference in path lengths between foci 381 and 382. In another example, beam splitters split a beam from a laser into a respective beam for each of the foci 381 through 382, with an optical distance between the beam splitters matching a pitch between the foci 381 through 382. In yet another example, lasers 360 and 362 are Q-switching lasers with appropriate timing for the Q-switching.

The foci 381 through 382 are produced in time synchronization across the spatial arrangement's longitudinal array for each pulse of the laser beams 361 and 363. Each of the plasma filaments 321 through 322 emits a respective one of a plurality of coherent portions 311 through 312 of the electromagnetic radiation 310 emanating from the remote position 330. The coherent portions 311 through 312 overlap and constructively interfere at an intended receiving position 390 away from the light of sight 340 because the foci 381 through 382 are produced in the time synchronization across the spatial arrangement.

In one embodiment, a direction 350 from the remote position 330 to the intended receiving position 390 is perpendicular to the light of sight 340, and the electromagnetic radiation 310 emanating from the remote position 330 propagates in the direction 350.

In general, the time synchronization accounts for a path length from the laser arrangement of lasers 360 and 362 through the wavefront modifier 370 to each of the foci 381 through 382, and accounts for a path length from each of the foci 381 through 382 to the intended receiving position 390. Thus, varying the timing between the pulses from lasers 360 and 362 varies the direction 350 from the remote position 330 to the intended receiving position 390.

Figure 4:
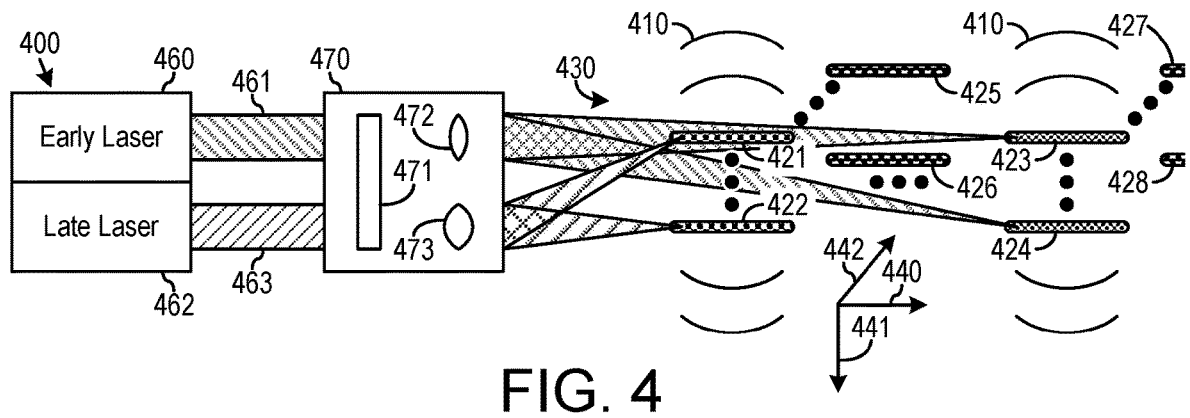
FIG. 4 is a block diagram of a system for generating electromagnetic radiation emanating from a three-dimensional array of plasma filaments at a remote position along a line of sight in accordance with an embodiment of the invention.

FIG. 4 is a block diagram of a system 400 for generating electromagnetic radiation 410 emanating from a three-dimensional array of plasma filaments 421 through 422, through plasma filaments 423 through 424, through plasma filaments 425, 426, 427, and 428 at a remote position 430 along a line of sight 440 in accordance with an embodiment of the invention. The embodiment of FIG. 4 includes combining the lateral array of FIG. 1 and the longitudinal array of FIG. 3 in the spatial arrangement of the foci of FIG. 4.

The early laser 460 of the laser arrangement generates laser beam 461 and the late laser 462 of the laser arrangement generates laser beam 463. The wavefront modifier 470 includes a diffraction grating 471 and a lens arrangement having lenses 472 and 473. The diffraction grating 471 separates the laser beam 461 into a two-dimensional array of diffraction orders, and the lens 472 focuses these separated diffraction orders at respective foci inducing plasma filaments 423 through 424, through plasma filaments 427 and 428. The diffraction grating 471 also separates the laser beam 463 into another two-dimensional array of diffraction orders, and the lens 473 focuses these separated diffraction orders at respective foci inducing plasma filaments 421 through 422, through plasma filaments 425 and 426.

Thus, the spatial arrangement of the foci is a three-dimensional spatial array including one dimension along the line of sight 440 and two dimensions 441 and 442 perpendicular to each other and perpendicular to the line of sight 440. As shown in FIG. 4, the plasma filaments 421 through 428 induced by the foci conform to the three-dimensional spatial array of the foci.

Figure 5:
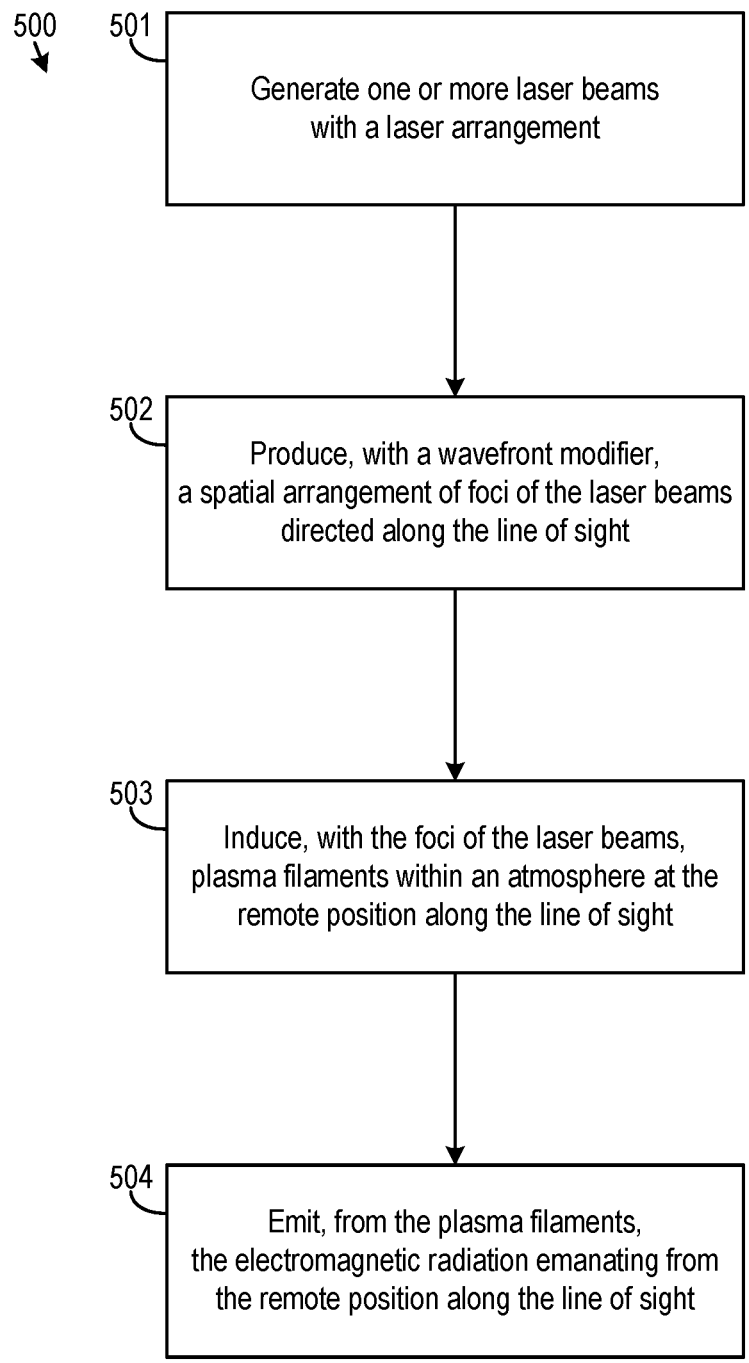
FIG. 5 is a flow diagram of a method for generating electromagnetic radiation emanating from plasma filaments spatially arranged at a remote position along a line of sight in accordance with an embodiment of the invention.

FIG. 5 is a flow diagram 500 of a method for generating electromagnetic radiation emanating from plasma filaments spatially arranged at a remote position along a line of sight in accordance with an embodiment of the invention At step 501, one or more laser beams are generated with a laser arrangement. At step 502, a wavefront modifier produces a spatial arrangement of foci of the laser beam or laser beams directed along the line of sight. At step 503, the foci induce plasma filaments within an atmosphere at the remote position along the line of sight. At step 504, the plasma filaments emit the electromagnetic radiation emanating from the remote position along the line of sight.

Figure 6B:
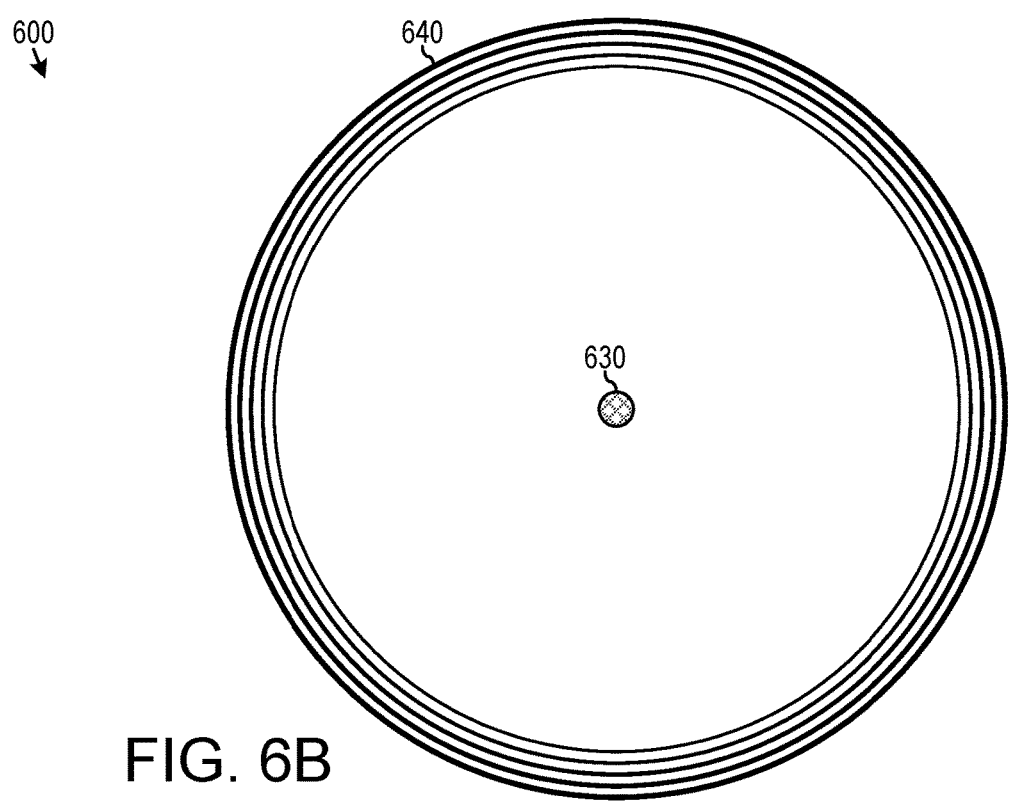

FIG. 6A and. 6B is are cross sections through an atmosphere 600 illustrating a focus 610 of a laser beam 620 inducing a plasma filament 630 that emits electromagnetic radiation 640 emanating from the remote position 650 along the line of sight 660 in accordance with an embodiment of the invention. FIG. 6B is a cross section through section 1-1 of FIG. 6A.

As previously discussed, an initial portion 621 of the laser beam 620 converges until an intensity is attained that initiates self-focusing in portion 622, and soon thereafter an intensity is reached that initiates formation of the plasma filament 630. The plasma filament 630 terminates at termination position 632 after plasma filament 630 dissipates the intensity sufficiently to terminate the self-focusing. As a pulse of the laser beam 620 propagates from the initiation position at focus 610 to the termination position 632, the plasma filament 630 emits broadband radiation that locally continues for the filament lifetime at each position along the plasma filament 630.

For discussion purposes, FIGS. 6A and 6B show an extraordinarily shortened filament lifetime with the plasma filament 630 ceasing emitting electromagnetic radiation 640 immediately after the pulse of the laser beam 620 passes each position along the plasma filament 630. Also for discussion purposes, FIGS. 6A and 6B show the electromagnetic radiation 640 is emitted only radially away from the plasma filament 630. Without these simplifications of shortened filament lifetime and radial electromagnetic radiation 640, a more realistic electromagnetic radiation 640 from the plasma filament 630 would partially or fully fill in the conical volume between the plasma filament 630 and the shown electromagnetic radiation 640 with additional components of the electromagnetic radiation 640. This corresponds to the broadband electromagnetic radiation 640 including longer wavelengths than implied by FIGS. 6A and 6B.

However, FIGS. 6A and 6B fairly depict the higher frequency components of the electromagnetic radiation 640. The burst of electromagnetic radiation 640 concentrates energy at the leading edge as indicated by the thick lines of the shown electromagnetic radiation 640, and the energy diminishes with the thermal decay of the plasma filament 630 toward the trailing edge as indicated by the thin lines of the shown electromagnetic radiation 640.

Figure 7:
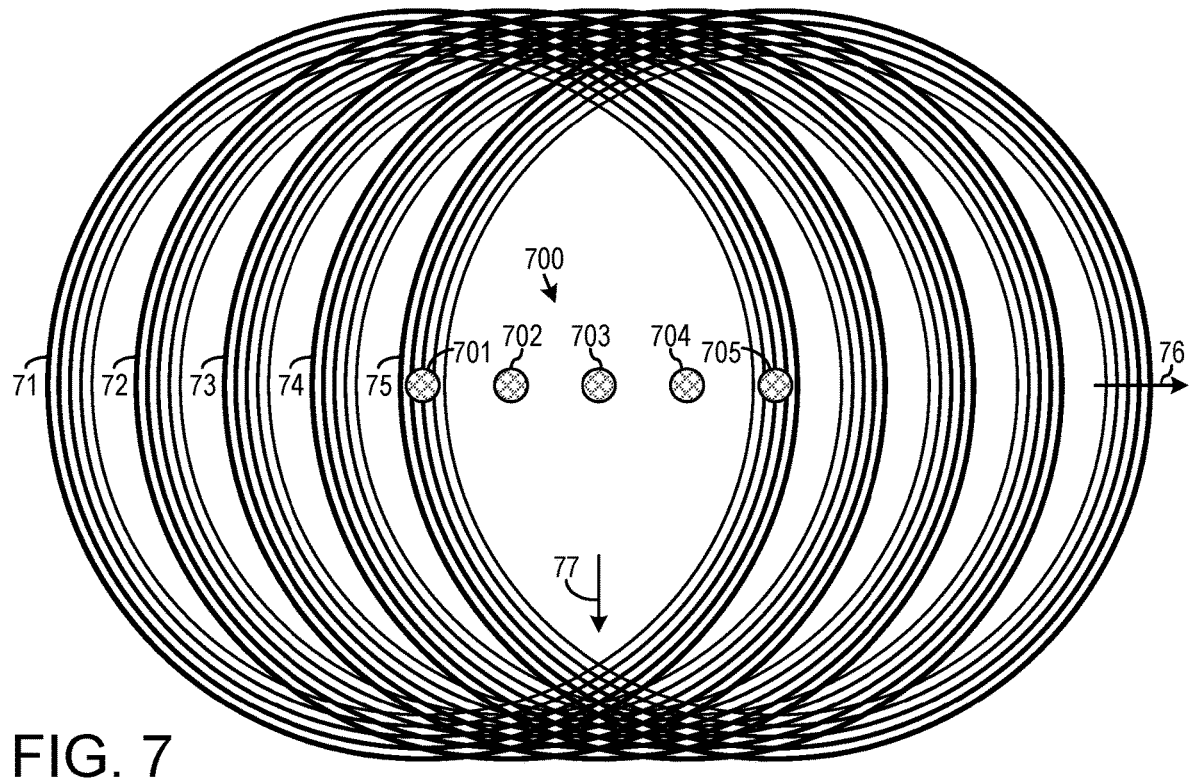
FIG. 7 illustrates a linear array of laser-induced plasma filaments emitting electromagnetic radiation emanating from a remote position along a line of sight in accordance with an embodiment of the invention.

FIG. 7 illustrates a linear array 700 of laser-induced plasma filaments 701, 702, 703, 704, and 705 respectively emitting electromagnetic radiation 71, 72, 73, 74, and 75 emanating from a remote position along a line of sight in accordance with an embodiment of the invention. The plasma filaments 701, 702, 703, 704, and 705 are separated with a pitch corresponding to twice the distance between the leading and trailing edges of each of the emitted electromagnetic radiation 71, 72, 73, 74, and 75. Thus, the electromagnetic radiation 71, 72, 73, 74, and 75 emanating along direction 76 alternates between energy bursts and quiescence, such that along direction 76, the total electromagnetic radiation 71, 72, 73, 74, and 75 emphasizes a wavelength matching the pitch between the laser-induced plasma filaments 701, 702, 703, 704, and 705. The number of cycles of the emphasized wavelength along direction 76 equals the number of the plasma filaments 701, 702, 703, 704, and 705.

Furthermore, when the total length of the linear array 700 matches the longest wavelength conveyed within the total electromagnetic radiation 71, 72, 73, 74, and 75, the total electromagnetic radiation 71, 72, 73, 74, and 75 along direction 76 includes every phase of this longest wavelength, such that the longest wavelength is nearly eliminated due to destructive interference along direction 76. However, it will be appreciated that narrow bandwidth radiation is achieved even when the total length of the linear array 700 is significantly shorter than the longest wavelength. For other wavelengths between this longest wavelength and the emphasized wavelength, the total electromagnetic radiation 71, 72, 73, 74, and 75 along direction 76 includes a variety of phases of these other wavelengths when they are not harmonics of the emphasized wavelength, such that these other wavelengths wavelength are nearly eliminated or diminished due to destructive interference along direction 76. Slight intentional or unavoidable randomness in the pitches between the plasma filaments 701, 702, 703, 704, and 705 also diminishes the harmonics. Therefore, the total electromagnetic radiation 71, 72, 73, 74, and 75 along direction 76 becomes narrow bandwidth radiation at the emphasized wavelength matching the pitch of the plasma filaments 701, 702, 703, 704, and 705.

Returning to FIG. 1, when the intended receiving position is along direction 151 corresponding to the direction 76 of FIG. 7, the intended receiving position along direction 151 receives the electromagnetic radiation 110 emphasizing a narrow bandwidth with a peak wavelength matching the pitch between the plasma filaments 121 through 122.

The laser arrangement 160 and the wavefront modifier 170 initiate each of the foci 181 through 182 at a respective relative timing. The plasma filaments 121 through 122 conform with the spatial arrangement of the foci 181 through 182. The plasma filaments 121 through 122 emit the electromagnetic radiation, which is confined to a narrow bandwidth having a peak wavelength. The spatial arrangement and the respective relative timing of the foci 181 through 182 specify the narrow bandwidth of the electromagnetic radiation.

Returning to FIG. 7, along direction 77, the electromagnetic radiation 71, 72, 73, 74, and 75 constructively and destructively interferes as shown with the Moiré pattern at the bottom of FIG. 7. Within a narrow angular range around direction 77, the electromagnetic radiation 71, 72, 73, 74, and 75 constructively interfere, such that the total amplitude in the far field along direction 77 multiplies the amplitude emitted by a single plasma filament by a number of the plasma filaments 701, 702, 703, 704, and 705. The constructive interference along direction 77 occurs for every wavelength within the broadband electromagnetic radiation 71, 72, 73, 74, and 75.

Note that in contrast to the narrow angular range of broadband electromagnetic radiation 71, 72, 73, 74, and 75 along direction 77, the electromagnetic radiation 71, 72, 73, 74, and 75 along the direction 76 becomes narrow bandwidth radiation over a broad angular range. As discussed below, a three-dimensional spatial array combines these effects to achieve narrow bandwidth radiation directed to a narrow angular range.

Figure 8:
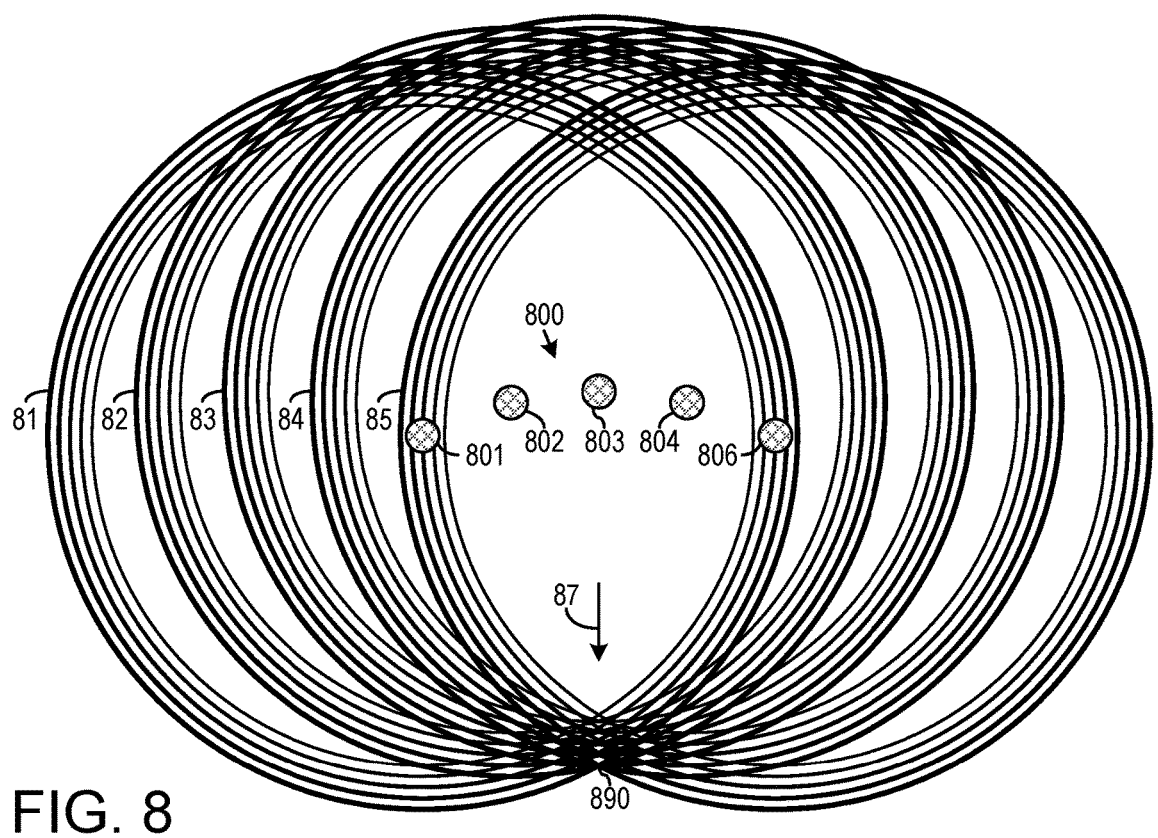
FIG. 8 illustrates a curved array of laser-induced plasma filaments emitting electromagnetic radiation emanating from a remote position along a line of sight in accordance with an embodiment of the invention.

FIG. 8 illustrates a curved array 800 of laser-induced plasma filaments 801, 802, 803, 804, and 805 respectively emitting electromagnetic radiation 81, 82, 83, 84, and 85 emanating from a remote position along a line of sight in accordance with an embodiment of the invention. The plasma filaments 801, 802, 803, 804, and 805 are arranged on a surface of a cylinder, which has a central axis through the intended receiving position 890, where the electromagnetic radiation 81, 82, 83, 84, and 85 constructively interfere. FIG. 8 illustrates a spatial arrangement that achieves constructive interference in the near field at the intended receiving position 890 for every wavelength within the broadband electromagnetic radiation 71, 72, 73, 74, and 75.

In FIG. 7 and FIG. 8, the electromagnetic radiation is confined to propagate primarily along a principal direction 77 or 87 away from the remote position of the arrays 700 or 800. The spatial arrangement and the respective relative timing of the foci inducing arrays 700 or 800 specify the principal direction 77 or 87 of the electromagnetic radiation.

Returning to FIG. 4, a three-dimensional array of foci induces a three-dimensional array of plasma filaments 421 through 428. When the intended receiver direction is the direction 441, the lateral dimension along the direction 441 specifies a bandwidth of the electromagnetic radiation 410. The lateral dimension along the direction 442 into the page of FIG. 4 specifies an angular range of the electromagnetic radiation 410 within the plane encompassing directions 441 and 442. The longitudinal dimension along the line of sight 440 specifies an angular range of the electromagnetic radiation 410 within the plane encompassing directions 441 and 440. Because the plasma filaments 421 through 428 typically have lengths in the direction 440 greater than their widths in directions 441 and 442, the three-dimensional array of plasma filaments 421 through 428 typically has a pitch along the longitudinal direction 440 greater than the pitch along the lateral direction 442, and hence the resolution of the angular range within the plane encompassing directions 441 and 440 is less than the resolution of the angular range within the plane encompassing directions 441 and 442.

The laser arrangement 400 and the wavefront modifier 470 initiate each foci at a respective relative timing. The plasma filaments 421 through 428 conform with the spatial arrangement of the foci and emit the electromagnetic radiation 410 confined to propagate primarily along a principal direction 441 away from the remote position 430, and confined to a narrow bandwidth having a peak wavelength. The spatial arrangement and the respective relative timing of the foci specify the principal direction 441 of the electromagnetic radiation 410 and specify the narrow bandwidth of the electromagnetic radiation 410. Thus, the spatial arrangement of the foci is configured to confine the electromagnetic radiation 410 to propagate primarily along a principal direction 441 away from the remote position 430, to confine the electromagnetic radiation 410 to a narrow bandwidth having a peak wavelength, or both.

In one embodiment, the electromagnetic radiation 410 is a radiofrequency signal propagating primarily along the principal direction 441, which is perpendicular to the light of sight 440 at the remote position 430. The radiofrequency signal is generally in a frequency range of kHz to GHz. The spatial arrangement and the respective relative timing of the foci specify the principal direction 441 and the narrow bandwidth of the radiofrequency signal.

The induced three-dimensional array of plasma filaments 421 through 428 operates similar to a phased-array antenna electronically steerable in any direction. Differences include that a phased-array antenna is typically a two-dimensional array (with dimensions corresponding to directions 440 and 442) driven with narrow bandwidth signals having specific phases. The three-dimensional array of plasma filaments 421 through 428 requires a third dimension along direction 441 to achieve electromagnetic radiation 410 with narrow bandwidth. However, this third dimension is not needed to emit broadband electromagnetic radiation 410 steerable in any direction.

From the perspective of the intended receiver, the spatial array of foci is placed anywhere in the sky having clear lines of sight from both the intended receiver and the laser source at laser arrangement 400 and wavefront modifier 470. Thus, the system 400 is operable to produce the electromagnetic radiation 410 with narrow bandwidth appearing to originate anywhere in the accessible sky above the intended receiver. Therefore, obstacles such as buildings and terrain are avoidable with appropriate placement of the plasma filaments 421 through 428.

In one embodiment, the wavefront modifier 470 is a spatial light modulator. The spatial light modulator dynamically modulates one or more of the line of sight 440, the remote position 430 of the spatial arrangement of the foci along the line of sight 440, and the spatial arrangement of the foci, such as a three-dimensional arrangement of the foci. The spatial light modulator dynamically modulates the spatial arrangement of the foci to modulate dynamically one or both of a principal direction and a peak wavelength of the electromagnetic radiation 410 emanating from the remote position 430 along the light of sight 440. It will be appreciated that the principal direction need not be direction 441 perpendicular to the line of sight 440, although efficiency is higher in principal directions close to perpendicular to the line of sight 440. The plasma filaments 421 through 428 conforming with the spatial arrangement emit the electromagnetic radiation 410 with the peak wavelength along the principal direction from the remote position 430.

In one embodiment, the three-dimensional array is created by sweeping multiple laser pulses through the atmosphere. For example, the wavefront modifier 470 generates a two-dimensional array of plasma filaments 421 and 425 through 423 and 427 from a first set of respective pulses from lasers 460 and 462, and subsequently generates another two-dimensional array of plasma filaments 422 and 426 through 424 and 428 from a second set of respective pulses from lasers 460 and 462. Although the electromagnetic radiation 410 propagates in the delay between the first and second set of laser pulses, sweeping the remote position 430 between the two sets of laser pulses compensates for this propagation delay. This sweeping is potentially as fast as or faster than the speed of light along principal direction 441, enabling either enhanced constructive interfere along principal direction 441 or higher and lower frequencies than contained in individual bursts from each plasma filaments 421 through 428.

From the above description of systems and methods for Remotely Emitting Confined Electromagnetic Radiation from Laser-Induced Plasma Filaments, it is manifest that various techniques may be used for implementing the concepts of systems 100, 200, 300, and 400 and method 500 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that each of systems 100, 200, 300, or 400 or method 500 is not limited to the particular embodiments described herein, but is capable of many embodiments without departing from the scope of the claims.

We claim:

1. A system for generating confined electromagnetic radiation emanating from a remote position along a line of sight, the system comprising:
   a laser arrangement for generating at least one laser beam; and
   a wavefront modifier for producing a spatial arrangement of a plurality of foci of the at least one laser beam directed along the line of sight, wherein the foci induce a plurality of plasma filaments within an atmosphere at the remote position along the line of sight, and the plasma filaments emit the electromagnetic radiation emanating from the remote position along the line of sight.

2. The system of claim 1, wherein:
   the laser arrangement is for generating at least one laser beam having a planar wavefront; and
   the wavefront modifier includes a diffraction grating and a lens arrangement for producing, from the planar wavefront, a plurality of superimposed spherical wavefronts each converging at a respective one of the foci of the at least one laser beam.

3. The system of claim 1, wherein the spatial arrangement is configured to confine the electromagnetic radiation to propagate primarily along a principal direction away from the remote position, to confine the electromagnetic radiation to a narrow bandwidth having a peak wavelength, or both.

4. The system of claim 1, wherein:
   the foci are concurrently produced across the spatial arrangement from a pulse of the at least one laser beam; and
   the pulse has a pulse duration at least an order of magnitude shorter than a filament lifetime of the plasma filaments.

5. The system of claim 4, wherein:
   during the filament lifetime each of the plasma filaments emits a respective one of a plurality of portions of the electromagnetic radiation emanating from the remote position; and
   the portions of the electromagnetic radiation are coherent because the foci are concurrently produced across the spatial arrangement and because the pulse duration is much shorter than the filament lifetime.

6. The system of claim 1, wherein the foci are produced in time synchronization across the spatial arrangement from at least one pulse of the at least one laser beam.

7. The system of claim 6, wherein:
   each of the plasma filaments emits a respective one of a plurality of coherent portions of the electromagnetic radiation emanating from the remote position; and
   the coherent portions overlap and constructively interfere at an intended receiving position away from the light of sight because the foci are produced in the time synchronization across the spatial arrangement.

8. The system of claim 7, wherein a direction from the remote position to the intended receiving position is perpendicular to the light of sight, and the electromagnetic radiation emanating from the remote position propagates in the direction.

9. The system of claim 7, wherein the time synchronization accounts for a path length from the laser arrangement through the wavefront modifier to each of the foci and a path length from each of the foci to the intended receiving position.

10. The system of claim 1, wherein:
    each of the foci of the at least one laser beam induces a respective one of the plasma filaments within the atmosphere, such that the plasma filaments conform to the spatial arrangement of the foci of the at least one laser beam; and each of the plasma filaments emits a respective one of a plurality of coherent portions of the electromagnetic radiation emanating from the remote position.

11. The system of claim 1, wherein:

the spatial arrangement of the foci is a three-dimensional spatial array including one dimension along the line of sight and two dimensions perpendicular to each other and perpendicular to the line of sight; and the plasma filaments induced by the foci conform to the three-dimensional spatial array of the foci of the at least one laser beam.

12. The system of claim 1, wherein:

the laser arrangement and the wavefront modifier are for initiating each of the foci at a respective relative timing;

the plasma filaments conforming with the spatial arrangement emit the electromagnetic radiation confined to propagate primarily along a principal direction away from the remote position; and the spatial arrangement and the respective relative timing of the foci specify the principal direction of the electromagnetic radiation.

13. The system of claim 12, wherein:

the electromagnetic radiation is confined to a narrow bandwidth having a peak wavelength; and the spatial arrangement and the respective relative timing of the foci specify the narrow bandwidth of the electromagnetic radiation.

14. The system of claim 13, wherein:

the plasma filaments emit the electromagnetic radiation that is a radiofrequency signal propagating primarily along the principal direction, which is perpendicular to the light of sight at the remote position; and the spatial arrangement and the respective relative timing of the foci specify the principal direction and the narrow bandwidth of the radiofrequency signal.

15. The system of claim 1, wherein:

the laser arrangement and the wavefront modifier are for initiating each of the foci at a respective relative timing;

the plasma filaments conforming with the spatial arrangement emit the electromagnetic radiation confined to a narrow bandwidth having a peak wavelength; and the spatial arrangement and the respective relative timing of the foci specify the narrow bandwidth of the electromagnetic radiation.

16. The system of claim 1, wherein:

at an initiation position of a respective one of the plasma filaments for each focus of the foci, the focus of the at least one laser beam converges and attains an intensity that initiates self-focusing in the atmosphere and initiates formation of the respective one of the plasma filaments; and at a termination position of the respective one of the plasma filaments for each of the foci, the respective one of the plasma filaments dissipates the intensity sufficiently to terminate the self-focusing in the atmosphere and terminate continuance of the respective one of the plasma filaments.

17. The system of claim 1, wherein the laser arrangement and the wavefront modifier are adapted to control an initiation position and a termination position along the line of sight of a respective one of the plasma filaments for each of the foci.

18. The system of claim 1, wherein the wavefront modifier is a spatial light modulator, and:

the spatial light modulator dynamically modulates one or more of the line of sight, the remote position of the spatial arrangement of the foci along the line of sight, and the spatial arrangement of the foci; and the spatial light modulator dynamically modulates the spatial arrangement of the foci to dynamically modulate one or both of a principal direction and a peak wavelength of the electromagnetic radiation emanating from the remote position along the light of sight, such that the plasma filaments conforming with the spatial arrangement emit the electromagnetic radiation with the peak wavelength along the principal direction from the remote position.

19. A method using the system of claim 1 for generating the electromagnetic radiation emanating from the remote position along the line of sight, the method comprising:

with the laser arrangement, generating the at least one laser beam;

with the wavefront modifier, producing the spatial arrangement of the foci of the at least one laser beam directed along the line of sight;

with the foci of the at least one laser beam, inducing the plasma filaments within the atmosphere at the remote position along the line of sight; and from the plasma filaments, emitting the electromagnetic radiation emanating from the remote position along the line of sight.

20. A method for generating confined electromagnetic radiation emanating from a remote position along a line of sight, the method comprising:

with a laser arrangement, generating at least one laser beam;

with a wavefront modifier, producing a spatial arrangement of a plurality of foci of the at least one laser beam directed along the line of sight;

with the foci of the at least one laser beam, inducing a plurality of plasma filaments within an atmosphere at the remote position along the line of sight; and from the plasma filaments, emitting the electromagnetic radiation emanating from the remote position along the line of sight.

* * * * *